United States Patent
Han et al.

(10) Patent No.: US 7,369,924 B2
(45) Date of Patent: May 6, 2008

(54) SYSTEM AND METHOD FOR PROVIDING GUIDANCE TOWARDS A FAR-POINT POSITION FOR A VEHICLE IMPLEMENTING A SATELLITE-BASED GUIDANCE SYSTEM

(75) Inventors: Shufeng Han, Johnston, IA (US); Frederick W. Nelson, Waukee, IA (US); Terence D. Pickett, Waukee, IA (US); John F. Reid, Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/447,220

(22) Filed: Jun. 5, 2006

(65) Prior Publication Data

US 2007/0282527 A1 Dec. 6, 2007

(51) Int. Cl.
*G01C 22/00* (2006.01)
*H04N 7/00* (2006.01)

(52) U.S. Cl. .......................... 701/28; 348/120

(58) Field of Classification Search ................ 348/120; 342/357.17; 701/2.3, 28
See application file for complete search history.

(56) References Cited

U.S. PATENT DOCUMENTS

| | | | | |
|---|---|---|---|---|
| 6,686,951 | B1* | 2/2004 | Dickson et al. ............. | 348/120 |
| 2004/0215377 | A1* | 10/2004 | Yun ............................ | 701/28 |
| 2004/0264763 | A1* | 12/2004 | Mas et al. ................... | 382/154 |

* cited by examiner

*Primary Examiner*—Mark Hellner
(74) *Attorney, Agent, or Firm*—Suiter Swantz pc llo

(57) ABSTRACT

The present invention is a method for providing guidance towards a far-point position for a vehicle implementing a satellite-based guidance system. The method includes capturing an image. The method further includes providing the image in a digital format to an algorithm. The method further includes isolating far-point pixelized data of the provided image. The method further includes generating data for causing a steering control system of the vehicle implementing the satellite-based guidance system to maintain the vehicle on a straight-line path towards the far-point position.

20 Claims, 4 Drawing Sheets

SYSTEM AND METHOD FOR PROVIDING GUIDANCE TOWARDS A FAR-POINT POSITION FOR A VEHICLE IMPLEMENTING A SATELLITE-BASED GUIDANCE SYSTEM

FIELD OF THE INVENTION

The present invention relates to the field of satellite-based guidance systems, such as Global Positioning System (GPS)-based guidance systems, and particularly to a system and method for providing guidance towards a far-point position for a vehicle implementing a satellite-based guidance system.

BACKGROUND OF THE INVENTION

Satellite-based guidance systems, such as GPS-based guidance systems, are commonly used today as a navigation aid in cars, airplanes, ships, computer-controlled harvesters, mine trucks and other vehicles. For instance, GPS-based guidance systems utilized in farming implements may allow for precise application of crop protection products, such as fertilizers, pesticides or lime. However, current GPS-based guidance systems may experience difficulty guiding when heavy foliage or other permanent obstructions (mountains, buildings, etc.) prevent or inhibit GPS signals from being accurately received by the system. A number of GPS-based systems may include Inertial Measurement Units (IMUs) or Terrain Compensation Units (TCUs) to provide guidance capabilities under GPS-obstructed conditions. However, IMUs and TCUs tend to experience problems with drift (i.e., an ever-increasing error between IMU/TCU determined location and an actual location.

Therefore, it may be desirable to have a system and method for providing far-point vision augmentation functionality in a satellite-based guidance system which addresses the above-referenced problems and limitations of the current solutions.

SUMMARY OF THE INVENTION

Accordingly, an embodiment of the present invention is directed to a method for providing guidance towards a far-point position for a vehicle implementing a satellite-based guidance system. The method includes capturing an image. The method further includes providing the image in a digital format to an algorithm. The method further includes isolating far-point pixelized data of the provided image. The method further includes generating data for causing a steering control system of the vehicle implementing the satellite-based guidance system to maintain the vehicle on a straight-line path towards the far-point position.

A further embodiment of the present invention is directed to a guidance system, including: a satellite-based navigation system including: an antenna configured for collecting satellite-based navigation system signals; a receiver communicatively coupled with the antenna, the receiver configured for receiving the collected satellite-based navigation system signals and determining location of a vehicle implementing the guidance system; a display communicatively coupled with the receiver, the display configured for displaying satellite-based navigation system course information; and a controller communicatively coupled with the display and the receiver, the controller configured for allowing user input commands to be entered via the display; and a vision recognition augmentation system communicatively coupled with the satellite-based navigation system, the vision recognition augmentation system including: a camera configured for providing an image to the guidance system, wherein an algorithm isolates far-point pixelized data of the provided image and generates at least one steering error for causing a steering control system of the vehicle to maintain the vehicle implementing the guidance system on a straight-line path towards the far-point position.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
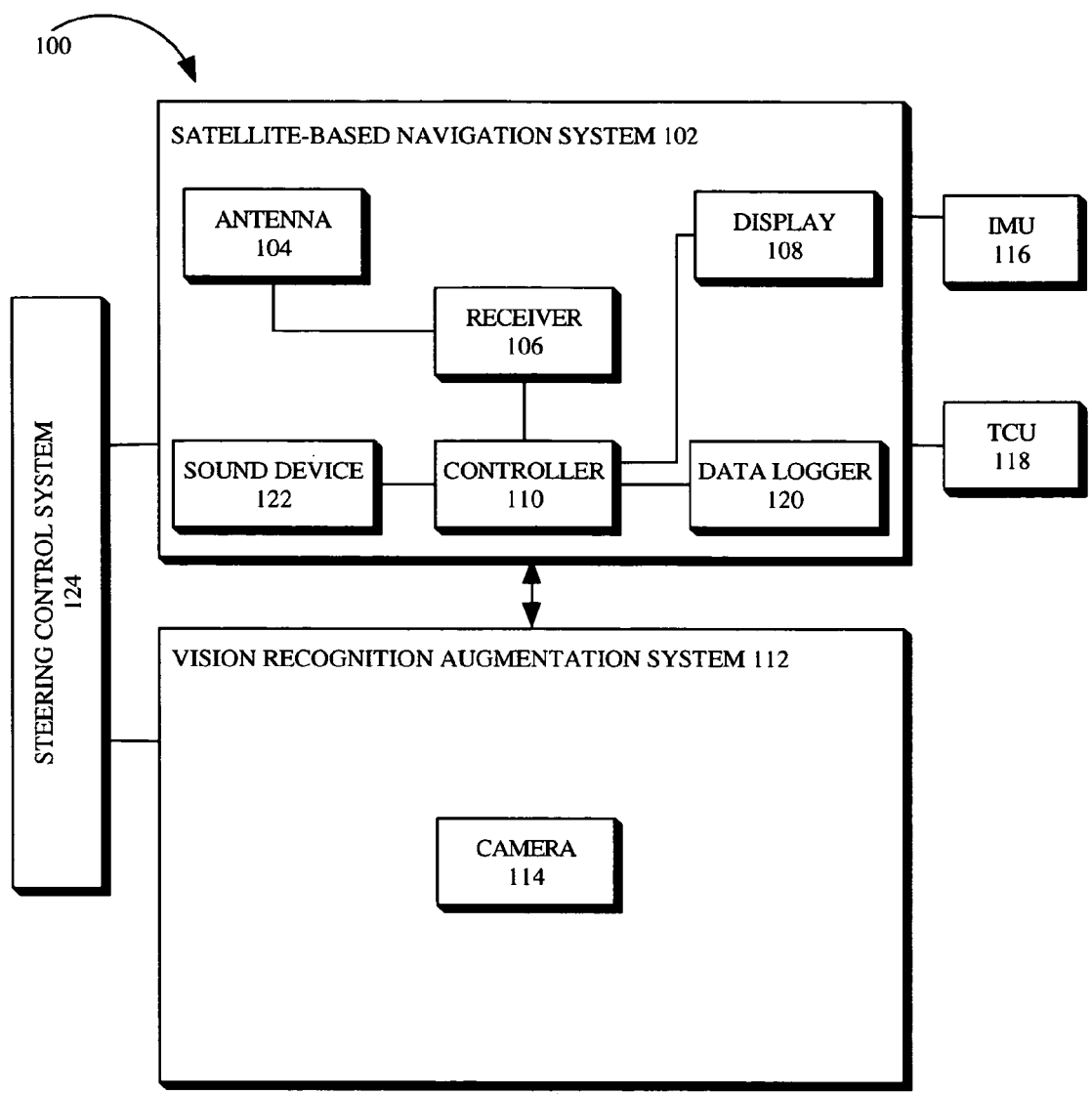
FIG. 1 is a block diagram illustration of a guidance system in accordance with an exemplary embodiment of the present invention.

FIG. 1 illustrates a block diagram configuration for a guidance system 100 in accordance with an exemplary embodiment of the present invention. In a present embodiment the guidance system 100 includes a satellite-based navigation system 102. For example, the satellite-based navigation system may be a GPS (Global Positioning System) system. In further embodiments, the satellite-based navigation system 102 may be a DGPS (Differential Global Positioning System), a Galileo Positioning System, a Global Navigation Satellite System (GNSS), or the like. In the exemplary embodiment, the satellite-based navigation system 102 includes an antenna 104 configured for collecting satellite-based navigation system signals. For instance, the antenna 104 may be a GPS antenna configured for collecting GPS signals. Further, the antenna 104 may be water-proof/water resistant and/or include magnetic mounts for allowing the antenna to be secured to the top of the cab of a vehicle, such as a tractor or applicator.

In the illustrated embodiment, the satellite-based navigation system 102 further includes a receiver 106 communicatively coupled with the antenna 104. The receiver 106 is configured for receiving the collected satellite-based navigation system signals and determining the location of a vehicle which is implementing the guidance system 100. The location information may then be utilized by the guidance system 100 for creating an accurate navigation path. For example, the receiver 106 may be a Differential Global Positioning System (DGPS) receiver. Further, the receiver 106 may be configured for receiving various types of signals, such as Wide-Area Augmentation Systems (WAAS) signals, Coast Guard signals, subscription L-band signals or a combination thereof. Still further, the type of signal received by the receiver 106 may be adjustably controlled by a user. In additional embodiments, the antenna 104 and the receiver 106 may be integrated into a single unit.

In the exemplary embodiment, the guidance system 100 further includes a display 108 communicatively coupled with the receiver 106. The display 108 is configured for displaying satellite-based navigation system course information. For instance, the display 108 may be configured for displaying GPS course information, such as a visual depiction or image of a current path of travel of a vehicle implementing the guidance system 100. In further embodiments, the display 108 may be a light bar or moving lines display.

In the illustrated embodiment, the guidance system 100 further includes a controller 110 communicatively coupled with the display 108. The display 108 is communicatively coupled with the receiver 106 via the controller 110. The controller 110 is configured for allowing user input commands to be entered via the display 108, such as for selecting menu options in the guidance system 100.

Figure 4:
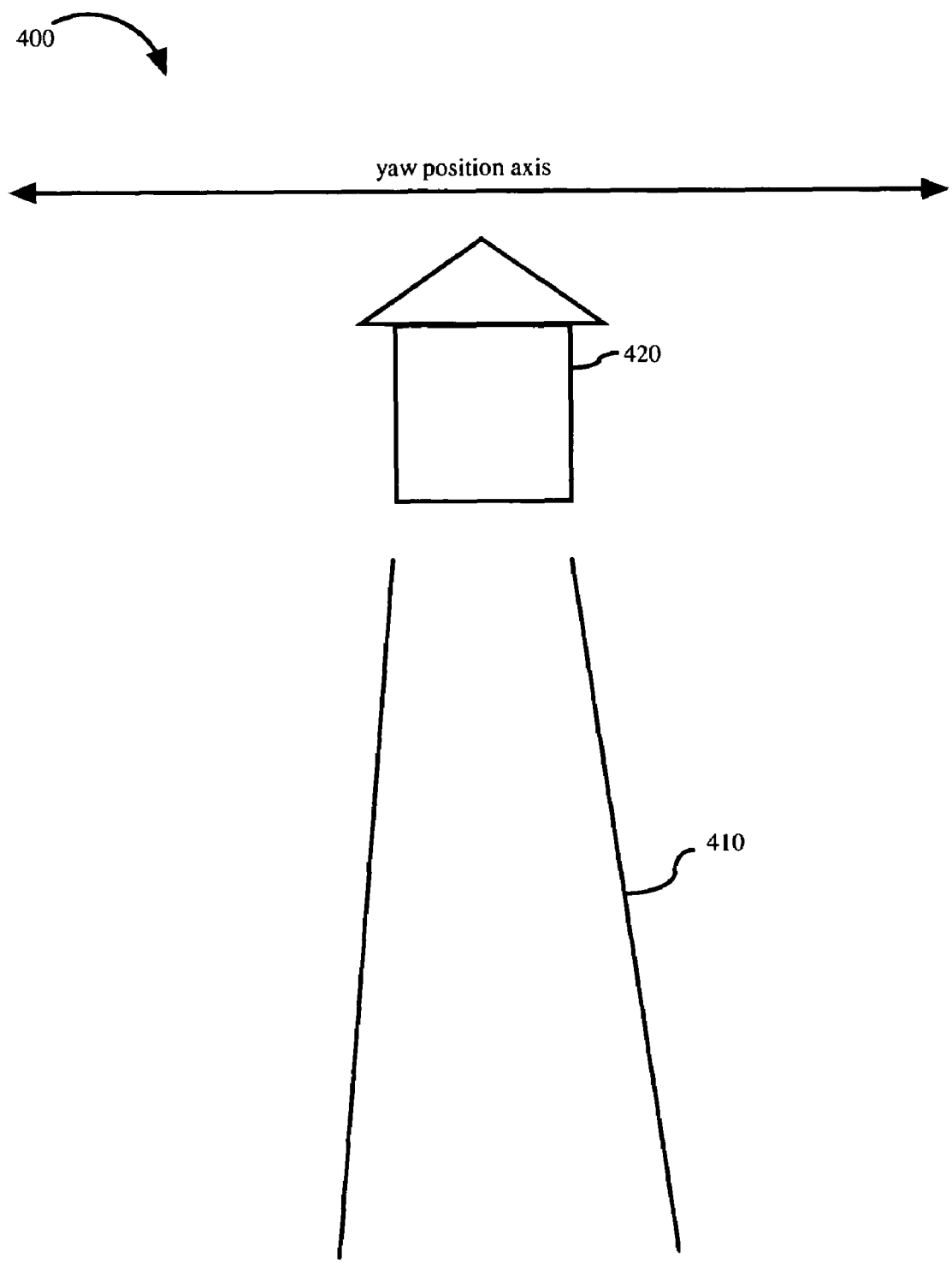
FIG. 4 is an illustration of an image provided to the guidance system in accordance with an exemplary embodiment of the present invention.

In the exemplary embodiment, the guidance system 100 further includes a vision recognition augmentation system 112 communicatively coupled with the satellite-based navigation system 102. The vision recognition augmentation system 112 includes a camera 114 configured for providing an image 400 (FIG. 4) to the guidance system 100. For instance, the camera 114 may be a digital camera configured for providing a digital image 400 to the guidance system 100. In the exemplary embodiment, the guidance system 100 is configured with a steering control system 124 for maintaining a vehicle which is implementing the satellite-based navigation system 102 on a desired course. For example, the guidance system 100 may maintain the vehicle on a straight-line path 410, such as the furrow/field swath illustrated in FIG. 4, towards a far-point position 420, such as the silo illustrated in FIG. 4, upon which the camera 114 of the guidance system is focused. In the present embodiment, the guidance system 100 utilizes an algorithm which isolates far-point pixelized data of the provided image 400. Further, the algorithm generates data for causing the steering control system 124 of the vehicle to maintain the vehicle on a straight-line path 410 towards the far-point position 420. For example, the algorithm may utilize the far-point pixelized data to cause the steering control system 124 of the vehicle to maintain the vehicle on the straight-line path 410. For instance, the algorithm may detect any change in a yaw position of the far-point pixelized data of the provided image 400 in subsequently captured images. The algorithm may further utilize the far-point pixelized data to calculate adjustments the steering control system 124 may need to make to ensure that the far-point pixelized data is maintained in a fixed yaw position in the subsequently captured images, thereby ensuring that the vehicle is traveling along the straight-line path 410. This may result in a guidance system 100 which can provide guidance during periods when satellite-based guidance system signals are not being received.

In additional embodiments, the guidance system 100 may further include a closed, non-satellite based system, such as an Inertial Measurement Unit (IMU) 116 for detecting altitude, location and motion of a vehicle implementing the IMU. For example, the IMU may use a combination of accelerometers and angular rate sensors for tracking how a vehicle implementing the IMU is moving and its location.

In alternative embodiments, the guidance system 100 may also include a Terrain Compensation Unit (TCU) 118. The TCU 118 may be configured for enhancing performance of the guidance system 100 under conditions which may cause a vehicle implementing the guidance system to roll, such as when the vehicle is on uneven or sloped ground. Under such conditions, guidance system errors 100 may occur due to the vehicle rolling to one side. The TCU 118 enhances guidance system 100 performance by compensating for such errors.

Further, in embodiments in which an IMU 116 or TCU 118 are being implemented, the algorithm may utilize the far-point pixelized data in combination with satellite-based guidance system data, such as satellite-based guidance system course information for causing the steering control system 124 of the vehicle to maintain the vehicle on the straight-line path 410. For example, the algorithm may generate one or more steering errors such that the steering control system 124 may maintain the isolated far-point pixelized data in a fixed yaw position on one or more subsequently captured images. If the yaw position of the data in the subsequently captured images remains fixed, this indicates that vehicle is traveling on the straight-line path 410. This may result in a guidance system 100 which provides constant drift corrections to IMU 116 or TCU 118 devices being used in the guidance system 100.

In the illustrated embodiment, the guidance system 100 further includes a data logger 120. The data logger 120 may be configured for storing field attribute data. For example, in the case of a tractor or applicator implementing the guidance system 100, the data logger 120 may mark field attributes such as rocks and drainage areas, or keep track of where material was applied and save such data for future reference. Further, the data logger 120 may include a visual display for providing a visual depiction of said field attribute data. In further embodiments, the guidance system 100 may include a sound device 122 for alerting a user of field attributes, such as when the vehicle nears a hazard in the field, where product has been applied, and/or when the vehicle needs to steer.

Figure 2:
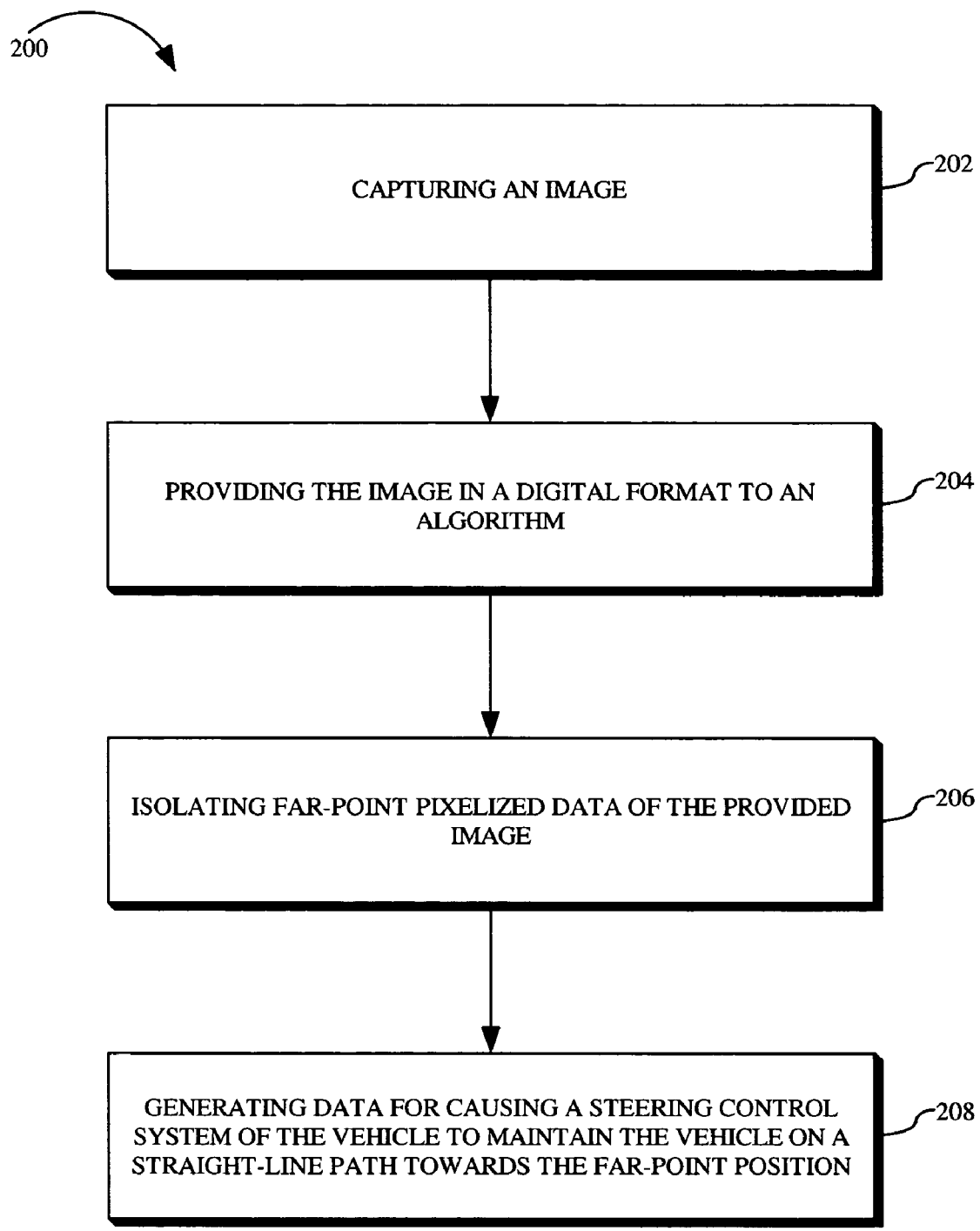
FIG. 2 is a flow chart illustrating a method for providing guidance towards a far-point position for a vehicle implementing a satellite-based guidance system in accordance with an exemplary embodiment of the present invention.
Figure 3:
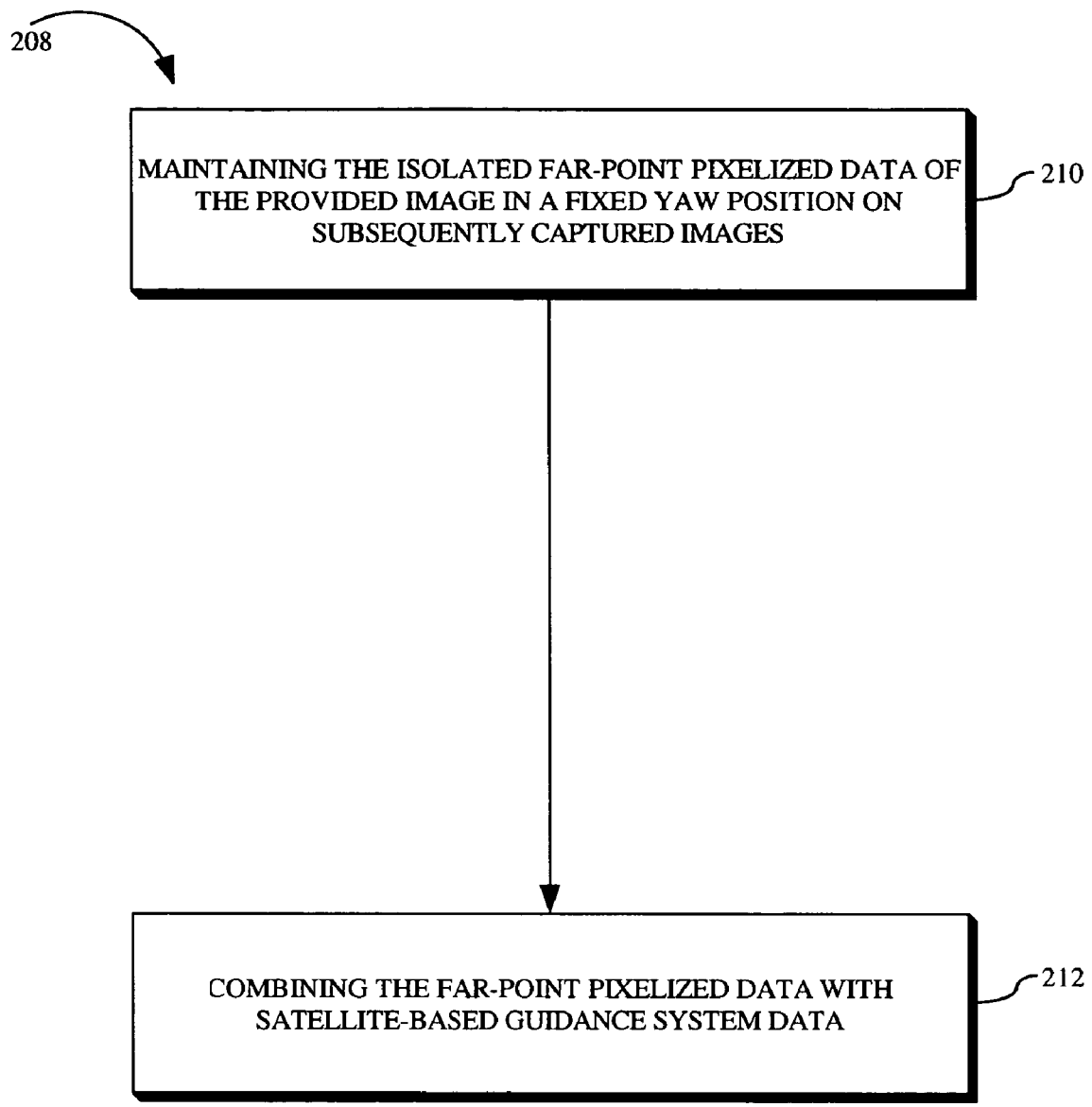
FIG. 3 is a flow chart illustrating steps included in generating data for causing a steering control system of a vehicle to maintain the vehicle on a straight-line path towards the far-point position, wherein generating said data is a step included in a method, as shown in FIG. 2, for providing guidance towards a far-point position for a vehicle implementing a satellite-based guidance system in accordance with an exemplary embodiment of the present invention.

FIG. 2 is a flow chart illustrating a method for providing guidance towards a far-point position for a vehicle implementing a satellite-based guidance system 200 in accordance with an exemplary embodiment of the present invention. The method 200 includes capturing an image 202. For instance, the image may be captured by a digital camera focused on the far-point position. The method 200 further includes providing the image in a digital format to an algorithm 204. The method 200 further includes isolating far-point pixelized data of the provided image 206. The method 200 further includes generating data for causing a steering control system of the vehicle to maintain the vehicle on a straight-line path towards the far-point position 208. In further embodiments (as shown in FIG. 3), the data generating step 208 may include the step of maintaining the isolated far-point pixelized data of the provided image in a fixed yaw position on subsequently captured images 210. For instance, if the yaw position for far-point pixelized data of the provided image is maintained in subsequently captured images, it is a positive indication that the camera and, accordingly, the vehicle implementing the camera, are traveling a straight line course towards the far-point position. In additional embodiments, the data generating step 208 may include the step of combining the far-point pixelized data with satellite-based guidance system data 212. For instance, in embodiments where the guidance system includes an IMU or a TCU, the guidance system may experience "drift" or accumulated error, as previously discussed. In such embodiments, the far-point pixelized data may be combined with satellite-based guidance system data (such as satellite-based guidance system course information) to generate data which includes at least one steering error for providing ongoing drift corrections and causing the steering control system to maintain the vehicle on the straight-line path towards the far-point position.

It is contemplated that the invention may take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

It is further contemplated that the medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, microphone, speakers, displays, pointing devices, and the like) may be coupled to the system either directly or through intervening I/O controllers.

Network adapters may also be coupled to the system to enable the data processing system to become couple to other data processing systems or storage devices through intervening private or public networks. Modems, cable modem and Ethernet cards are just a few of the currently available types of network adapters.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages is to be understood by the foregoing description, and it is apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for providing guidance towards a far-point position for a vehicle implementing a satellite-based guidance system and at least one of an Inertial Measurement Unit (IMU) and a Terrain Compensation Unit (TCU), comprising:
    capturing an image;
    providing the image in a digital format to an algorithm;
    isolating far-point pixelized data of the provided image; and
    combining the far-point pixelized data with satellite-based guidance system course information to generate at least one steering error for causing a steering control system of the vehicle to maintain the isolated far-point pixelized data of the provided image in a fixed yaw position on subsequently captured images and further causing the steering control system of the vehicle to maintain the vehicle on a straight-line path towards the far-point position and further providing drift correction functionality for the vehicle.

2. A method as claimed in claim 1, wherein the image is captured via a digital camera, the digital camera being focused on the far-point position.

3. A computer program product, comprising:
    a computer useable medium including computer usable program code for performing a method for providing guidance towards a far-point position for a vehicle implementing a satellite-based guidance system including:
    computer usable program code for capturing an image;
    computer usable program code for providing the image in a digital format to an algorithm;
    computer usable program code for isolating far-point pixelized data of the provided image; and
    computer usable program code for combining the far-point pixelized data with satellite-based guidance system course information to generate at least one steering error for causing a steering control system of the vehicle to maintain the isolated far-point pixelized data of the provided image in a fixed yaw position on subsequently captured images and further causing the steering control system of the vehicle to maintain the vehicle on a straight-line path towards the far-point position.

4. A computer program product as claimed in claim 3, wherein the image is captured via a digital camera, the digital camera being focused on the far-point position.

5. A guidance system, comprising:
    a satellite-based navigation system including:
        an antenna configured for collecting satellite-based navigation system signals;
        a receiver communicatively coupled with the antenna, the receiver configured for receiving the collected satellite-based navigation system signals and determining location of a vehicle implementing the guidance system;

a display communicatively coupled with the receiver, the display configured for displaying satellite-based navigation system course information; and a controller communicatively coupled with the display and the receiver, the controller configured for allowing user input commands to be entered via the display;

a vision recognition augmentation system communicatively coupled with the satellite-based navigation system, the vision recognition augmentation system including:

a camera configured for providing an image to the guidance system; and at least one of an Inertial Measurement Unit (IMU) and a Terrain Compensation Unit (TCU), wherein an algorithm isolates far-point pixelized data of the provided image and utilizes said far-point pixelized data in combination with the satellite-based navigation system course information to generate at least one steering error for maintaining the isolated far-point pixelized data of the provided image in a fixed yaw position on subsequently captured images, thereby causing a steering control system of the vehicle to maintain the vehicle on a straight-line path towards the far-point position and further providing drift correction functionality for the guidance system.

6. A guidance system as claimed in claim 5, wherein the provided image is a digital image.

7. A guidance system as claimed in claim 5, wherein the guidance system further includes a data logger configured for storing field attribute data for future reference.

8. A guidance system as claimed in claim 7, wherein the guidance system further includes a sound device configured for alerting a user when the vehicle is within a pre-determined distance of a field attribute.

9. A guidance system as claimed in claim 8, wherein the camera is a digital camera.

10. A guidance system as claimed in claim 5, wherein the satellite-based navigation system is a GPS navigation system.

11. A guidance system as claimed in claim 5, wherein the receiver is a Differential GPS (DGPS) receiver.

12. A guidance system as claimed in claim 5, wherein the IMU is configured for detecting altitude, location and motion of the vehicle.

13. A guidance system as claimed in claim 5, wherein the IMU implements at least one accelerometer and at least one angular rate sensor for tracking movement and location of the vehicle.

14. A guidance system as claimed in claim 5, wherein the receiver is adjustably controllable by a user for receiving various signal types.

15. A guidance system as claimed in claim 5, wherein the TCU is configured for promoting guidance accuracy when the vehicle is being operated upon at least one of uneven and sloped terrain.

16. A guidance system as claimed in claim 5, wherein the antenna and receiver are integrated into a single unit.

17. A guidance system as claimed in claim 7, wherein field attribute data includes a location of at least one area of the field at which material has been applied.

18. A guidance system as claimed in claim 17, wherein the data logger includes a visual display for providing a depiction of said field attribute data.

19. A guidance system as claimed in claim 5, wherein the antenna is at least one of water-proof and water-resistant.

20. A guidance system as claimed in claim 5, wherein the antenna includes at least one magnetic mount for securing the antenna to a cab of the vehicle.

* * * * *